(No Model.)
G. W. M. BOWEN.
JOURNAL BOX.
No. 500,794. Patented July 4, 1893.
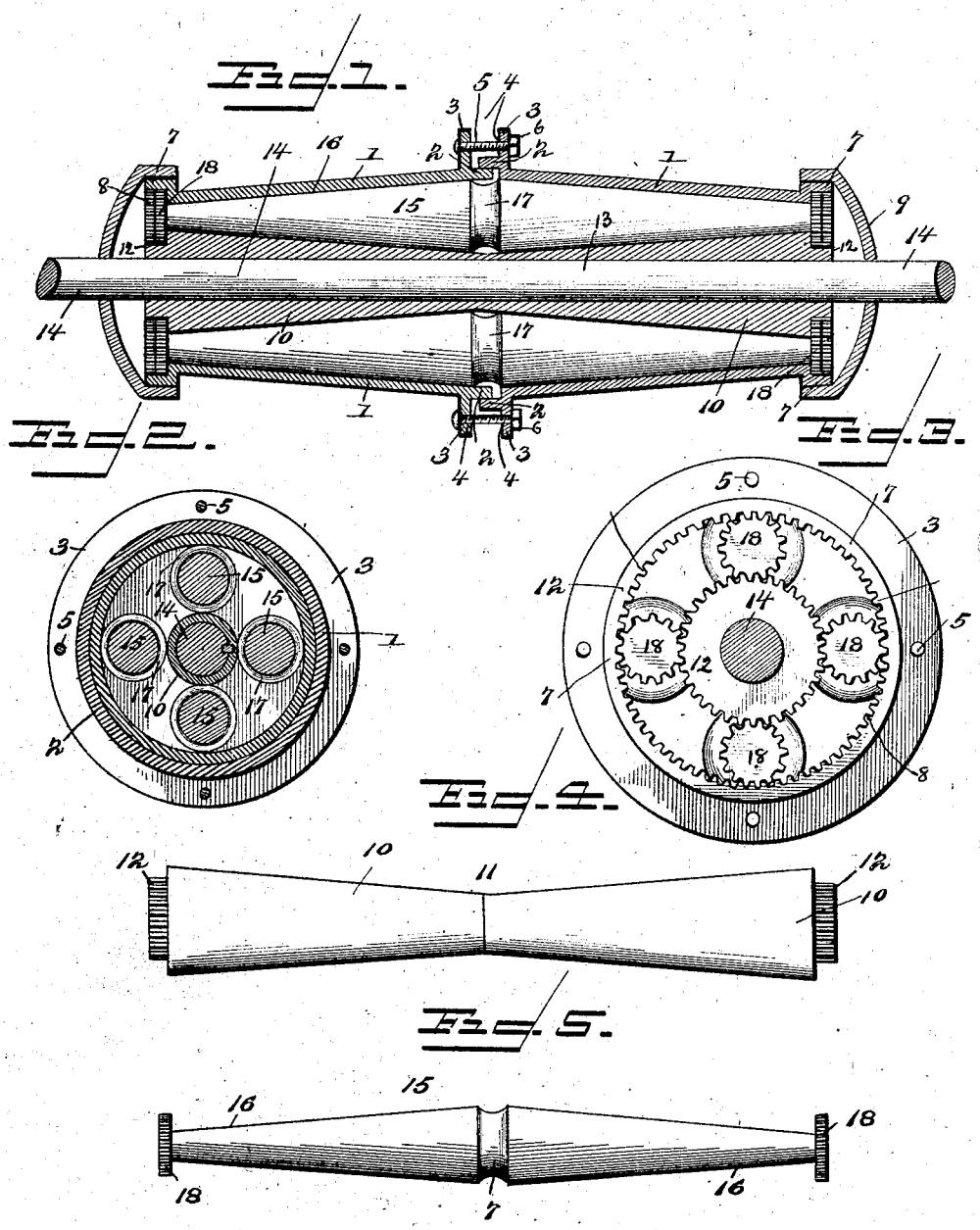
Witnesses
E. N. Stewart.
J. N. Liggers
Inventor
G. W. M. Bowen,
By his Attorneys,
C. A. Snow & Co.

UNITED STATES PATENT OFFICE.

GEORGE W. M. BOWEN, OF GLENCOE, NEBRASKA.

JOURNAL-BOX.

SPECIFICATION forming part of Letters Patent No. 500,794, dated July 4, 1893.

Application filed January 12, 1893. Serial No. 458,133. (No model.)

*To all whom it may concern:*

Be it known that I, GEORGE W. M. BOWEN, a citizen of the United States, residing at Glencoe, in the county of Dodge and State of Nebraska, have invented a new and useful Journal-Box, of which the following is a specification.

My invention relates to improvements in journal-boxes; the objects in view being to provide a box adapted by its peculiar construction to reduce friction in bearings of journals; and to so construct and arrange the box as to adapt the same to be adjusted for the purpose of compensating for wear.

With these various objects in view the invention consists in certain features of construction hereinafter specified and particularly pointed out in the claims.

Referring to the drawings:—Figure 1 is a vertical longitudinal section of a journal-box constructed in accordance with my invention. Fig. 2 is a transverse sectional view. Fig. 3 is an end elevation upon an enlarged scale with the end-cap removed. Fig. 4 is a detail of the central or main roller for receiving the shaft or axle. Fig. 5 is a similar view of one of the auxiliary revolvers or rollers.

Like numerals of reference indicate like parts in all the figures of the drawings.

In practicing my invention I employ two conical shells 1, whose bases are opposed to each other. The inner ends of the said shells are provided with longitudinally-disposed annular flanges 2, the flange of one shell being slightly greater in diameter than, and adapted to receive that of the other shell, whereby it may be said they in any manner telescope to a limited degree. At the juncture between the flanges 2 and the shells the said shells have their bases provided with radial flanges 3 which oppose each other and are perforated at intervals, as at 4, for the reception of bolts 5, which serve to clamp the shells together and adjust the same for purposes hereinafter apparent by means of their nuts 6. The outer or frustum-like ends of the shells are provided with external L-shaped flanges 7, whose edges are provided with a series of teeth 8, the same extending the entire length of the flange and being longitudinally-disposed. The external surfaces of these flanges have fitted thereover end-caps 9 by which dust is excluded from the bearings.

Located centrally in the shells 1 and extending from end to end thereof, is the main roller 10 whose periphery or surface is reduced gradually toward its center so that it resembles two frustums of cones, whose apices or frustum ends are joined. This forms a convex surface 11, which as will be seen, is of less diameter at its center. The outer ends or bases of the roller are slightly reduced and provided with a series of teeth 12. The roller 10 is bored internally as at 13, and is designed to receive and have secured therein by any ordinary means, as a key for instance, the shaft or axle 14 which it is designed to support. As before stated, this roller 10 is located within the conical shells 1. Surrounding the roller 10 and located at intervals, for instance one-eighth of an inch apart, is a series of auxiliary-rollers 15, which in contradistinction to the roller 10 has its external surface reduced from its center or points at each side of the same toward its ends, so that it resembles in external appearance a pair of cones having their bases joined. In this manner it will be seen that the reduced surfaces 16 are formed at each side of the center of the roller. Each of the rollers 15 is further provided with a central annular depression or groove 17 and the ends of the rollers are provided with spur-gears 18. The rollers 10 and 15 are so proportioned with relation to the external shells 1 that they completely fill the same, that is to say, the inclined or reduced faces 15 of the auxiliary rollers will roll or operate upon the corresponding faces of the shells and the main roller 10. At the same time the spur-gears 18 will engage the spur-gears 12 of the main roller and will also engage the teeth 8 at the ends of the shells, which latter teeth are wider than those of the gears 18 and about correspond with those of the roller 10. It will be seen that the teeth 8 and 12 serve to maintain the rollers 15 in proper relative position and prevent them from coming together. At the same time it will be observed that the internal roller 10 may freely revolve, the friction being reduced to a minimum by the employment of the auxiliary rollers 15. As wear occurs it is simply necessary to adjust the nuts 6 upon the bolts 5 and thus draw the two conical shells 1 together. This of course draws the teeth 8 inward and it is therefore necessary to have these teeth 8 slightly wider than those of the spur-gears 18, and for a similar reason it is necessary that the gears 12 of the main roller should be slightly wider than said spur gears 18.

From the foregoing description in connection with the accompanying drawings it will be seen that I have provided a journal-box embodying all of the advantages characteristic of that class of boxes employing a series of rollers and commonly called "roller-bearings." At the same time I obviate in such a construction the possibility of the auxiliary rollers working together or toward each other and maintain them strictly in their proper positions; and furthermore I provide for a perfect adjustment for compensating for all wear; and finally to secure the advantages over the ordinary roller-bearings of the conical roller-bearings, or what is commonly called a "cone-bearing."

Having described my invention, what I claim is—

1. In a journal-box, the combination with the opposite opposing conical telescoping shells having their bases telescopically connected and provided at one side thereof with annular flanges having perforations, and adjusting-bolts located therein, of a central main roller bored to receive an axle and having an external configuration opposite to that of the shells, and a series of auxiliary rollers located between the main roller and shell and having an external configuration opposite to that of the shell and main roller, substantially as specified.

2. In a journal-box, the combination with opposite conical shells having their bases opposing each other and adjustably connected and at their outer ends provided with longitudinally-disposed teeth, of a central roller provided at its ends with teeth corresponding in length with those of the shells and having an external configuration opposite to that of the shells, and a series of auxiliary rollers located between the main roller and shells and having external configurations corresponding with those of the shells and provided at its ends with spur-gears for engaging the teeth of the shells and the teeth of the gears of the main roller, substantially as specified.

In testimony that I claim the foregoing as my own I have hereto affixed my signature in the presence of two witnesses.

GEORGE W. M. BOWEN.

Witnesses:
W. M. ELLEDGE,
JACOB LONGACRE.